G. FORNACA.
CHANGE GEAR MECHANISM.
APPLICATION FILED FEB. 17, 1909.

1,051,993.

Patented Feb. 4, 1913.

3 SHEETS—SHEET 1.

Witnesses
Edmund D. Dubocq
Geo. N. Kerr

Inventor
Guido Fornaca
By his Attorneys
Edwards, Sager & Wooster

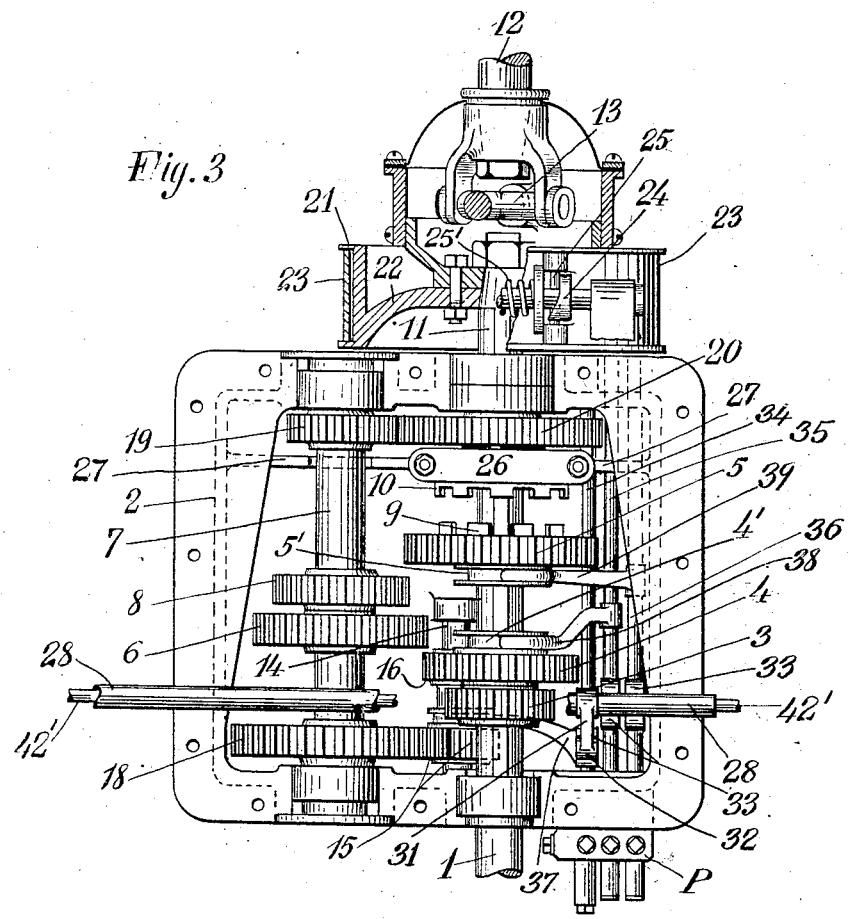

G. FORNACA.
CHANGE GEAR MECHANISM.
APPLICATION FILED FEB. 17, 1909.

1,051,993.

Patented Feb. 4, 1913.
3 SHEETS—SHEET 3.

UNITED STATES PATENT OFFICE.

GUIDO FORNACA, OF TURIN, ITALY, ASSIGNOR, BY MESNE ASSIGNMENTS, TO F. I. A. T., OF POUGHKEEPSIE, NEW YORK, A CORPORATION OF NEW YORK.

CHANGE-GEAR MECHANISM.

1,051,993.  Specification of Letters Patent.  Patented Feb. 4, 1913.

Application filed February 17, 1909.   Serial No. 478,458.

*To all whom it may concern:*

Be it known that I, GUIDO FORNACA, a subject of the King of Italy, residing at Turin, in the Province of Piedmont and Kingdom of Italy, have invented certain new and useful Improvements in Change-Gear Mechanism, of which the following is a full, clear, and exact specification.

This invention relates to change gear mechanism for vehicles and has particular reference to the construction and arrangement of change gear operating mechanism used in motor vehicles.

The invention more particularly has reference to the construction and arrangement of gear members for effecting the various speeds and reversing the direction of movement of the vehicle; to the arrangement and construction of the gear sliding rods in the gear casing; and to other advantageous instrumentalities and arrangements as will appear from the description which follows.

A feature of this invention comprises a casing which incloses the changeable gears and also the rods coöperating with the changeable gears.

An additional feature of the invention embodies a construction in which the parts shall be readily accessible without disarrangement, for inspection or repair, and which will permit the parts to be easily taken apart and assembled.

Figure 1:
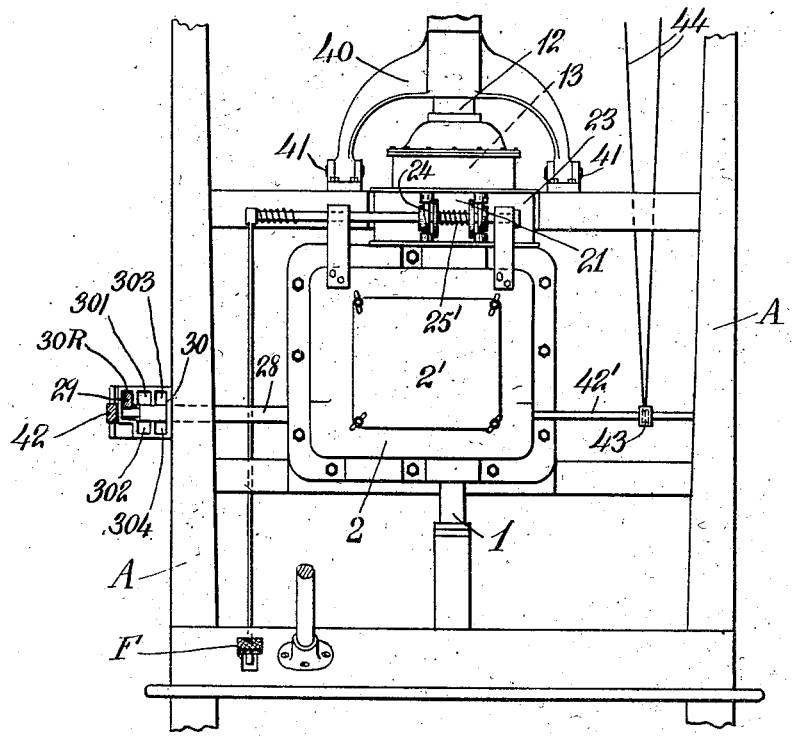
Figure 2:
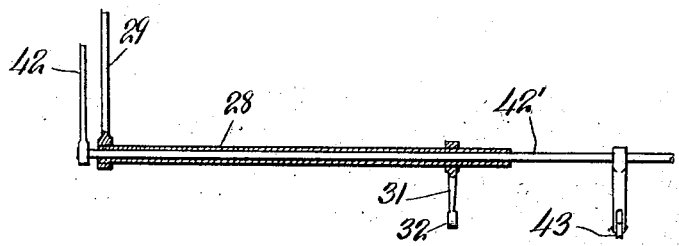
Figure 6:
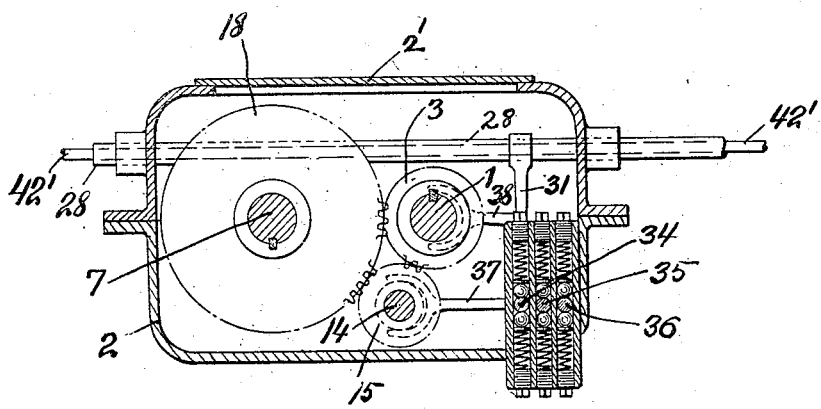

In the accompanying drawings Figure 1 is a plan view of a vehicle embodying the invention; Fig. 2 is a detail view of the emergency controlling lever and of the brake lever; Fig. 3 is a plan view of the gear case, with parts removed to show the changeable gear, gear rods and other controlling devices; Fig. 4 is a detailed plan view of a portion of the reversing gears; Fig. 5 is a detail elevation of a portion of one of the gear operating rods; and Fig. 6 is a vertical section through the block and front portion of the casing shown in Fig. 3.

The chassis A of the vehicle is of any approved construction, and the engine driving the shaft 1 is preferably in the forward end of the vehicle. Shaft 1 enters the forward side of the gear casing 2 through a suitable bushing, and carries the sliding gears 3, 4, and 5, driving said sliding gears by means of a spline. Gears 3 and 4 are rigidly joined together, and may be provided with a collar 4'. Suitably spaced from shaft 1 and journaled in bushings in gear casing 2 is a shaft 7 carrying rigidly mounted gears 18, 6, 8 and 19, in the order named; gear 18 being positioned at the extreme forward end of shaft 7 and gear 19 at the extreme opposite end.

Gear 3 when properly manipulated is adapted to mesh with gear 18; similarly, gear 4 is adapted to mesh with gear 6, and gear 5 is adapted to mesh with gear 8. Gear 5 is preferably provided with a collar 5', and may be further provided with the clutch element 9, shown in the specific form as circularly spaced lateral teeth, which, when properly manipulated, are adapted to enter and engage similarly spaced lateral teeth of clutch element 10. Clutch element 10 is rigidly fixed to the shaft 11, said shaft being substantially in alinement with the engine shaft 1, and extends through a suitable bushing in the gear casing 2. The engine shaft 1 terminates within and is suitably received and journaled in the clutch member 10. Shaft 11 is directly coupled with the driving shaft 12 by means of the universal coupling 13. Suitably spaced from shaft 1 is a shaft 14 rigidly mounted at one end in gear casing 2 and supported at the other end by means of a suitable lug positioned in the gear casing 2. Shaft 14 carries the gears 15, 16, which are rigidly joined together with an intermediate collar 17. Gears 15 and 16 are so spaced apart that when gear 16 is in mesh with gear 4, gear 15 is in mesh with gear 18.

As shown in Fig. 3, when gears 4, 16, 15 and 18 are in mesh the reverse movement of the vehicle is provided for. Gear 19 is constantly in mesh with gear 20, and gear 20 is rigidly joined with clutch member 10 and shaft 11. It is thus clear that the rotation of the engine shafts 1 is transferred successively through gears 4, 16, 15, 18, 19, and 20, and thus imparted to shafts 11 and 12.

Exterior of casing 2 and rigidly positioned on shaft 11 is the brake drum 21, supported by a spider 22. Surrounding brake drum 21 may be disposed the friction collar 23, the friction between said drum and said collar being controlled by a foot lever, F, or equivalent device, acting through intermediate rods by cams 24 abutting the pins 25, thereby overcoming the spring 25' and drawing the ends of the collar 23 toward each other. Normally the spring 25' maintains sufficient separation of the ends of the collar to avoid friction with the drum 21.

Clutch member 10 may be provided with a housing 26, which may be supported from the casing 2 by means of arms 27 projecting therefrom.

The gear selecting means, shown specifically as a pick-up rod 28 enters the casing 2 through a suitable bushing, and extends into and through the gear casing 2. The pick-up rod 28, in the specific form shown, may be a hollow rod, and is provided with an arm 29 carrying a suitable handle. Arm 29 is adapted to be moved by the driver into the proper slot of a guide plate 30 to obtain the desired movement and speed of the vehicle. Guide plate 30 comprises a longitudinal slot and five short transverse slots, namely 30$^R$, 301, 302, 303 and 304. The selecting means or pick-up rod 28 is provided with an arm 31 terminating in a ball end 32, said arm 31 and ball end 32 being inclosed in casing 2, preferably near the bottom. Rods 34, 35 and 36 may be mounted in casing 2 by means of resilient bushings, which may be of the type disclosed in the Patent No. 891,800, issued June 23, 1908. I prefer to mount the bushings on one side of rods, 34, 35 and 36 in a plug or block P, which may be removably positioned in the wall of the casing 2, as shown in Fig. 6, and thus allow the rods 34, 35 and 36 to be removed from the casing without disturbing the gears and selective means. The ends of rods 34, 35 and 36 which extend beyond the casing may be protected by a cap, if desired.

The movement of arm 29 in the longitudinal slot, moves the arm 31 in the gear casing 2 into engagement with one or the other of sockets 33 of the rods 34, 35, 36. Normally the sockets 33 are in line with the direction of the longitudinal movement of the pick-up rod 28. Suitably positioned on rods 34, 35 and 36 are forks 37, 38 and 39, respectively, coöperating respectively with the collars 17, 4' and 5'. It will be seen that by this connection the rods are entirely within the gear box, and immersed in the lubricant therein contained, as is also the operating end of the lever.

Referring to Figs. 1 and 3, the first forward speed is attained by manipulating the arm 29 to enter the slot 301, by which movement the ball end 32 of the arm 31 will engage socket 33 of rod 35 and move gears 3 and 4 forward, bringing gear 3 into mesh with gear 18. The engine shaft 1, driving gear 3, will cause gear 18, shaft 7 and gear 19, to be revolved, thereby revolving gear 20, shaft 11, universal 13 and shaft 12, and successively to the wheels of the vehicle. Similarly, when the handle 29 is moved into slot 302, the ball end 32 will engage the socket 33 of rod 35, and move rod 35 backward, bringing gear 4 into mesh with gear 6, and thus provide for the second forward speed. When handle rod 29 is moved into slot 303, the ball end 32 will engage socket 33 of rod 36, moving the same forward and thus bring gear 5 into mesh with gear 8, thereby providing for the third forward speed. The fourth forward speed is attained by moving rod 29 into slot 304, causing gear 5 to clutch with the clutch member 10 and thus the engine shaft is in direct drive with the shaft 11. To attain the reverse movement the rod 29 is moved into the slot 30$^R$ as indicated in Fig. 1, when the gears will be related as shown in Fig. 3, as described previously in detail.

It will be understood that normally the reverse gears 15 and 16 may or may not be rotated by gear 4. Such rotation of gears 15 and 16 is immaterial, since they would rotate idly and not affect the rotation of gear 18.

Referring particularly to Fig. 1, the vehicle may be provided with a yoke 40, hinged at 41, 41, to the chassis A, allowing the driving shaft 12 to be rocked in a vertical plane without injury to the driving parts. In addition, the vehicle may be provided with a brake operated by handle 42, actuating the rod 42' and pulley 43, and thus increasing the tension of the members 44 of the equalizer, or similar braking device. The rod 42 is preferably arranged within the hollow pick-up rod 28.

The casing 2 is provided with a cover 2', which is removably positioned by thumb screws, or equivalent means. By means of the cover 2', the changeable gear and gear rods may be readily inspected or oiled.

By the foregoing construction, the assembling of the complete gear shifting mechanism in one casing provides a much more accessible and simple arrangement than those in common use, and furthermore, these parts are thereby protected from dust and other foreign substances.

The invention is capable of various modifications and changes in the particular instrumentalities shown and described herein, and is not to be restricted to the particular arrangement described and illustrated.

Having thus described my invention, I declare that what I claim as new and desire to secure by Letters Patent is:—

1. The combination of a casing, a driving shaft mounted to extend within said casing, a plurality of gears thereon, a propeller shaft in alinement with said driving shaft, one end of said propeller shaft extending into said casing, a gear on said propeller shaft, means for releasably connecting said driving shaft and said propeller shaft, a counter-shaft mounted in said casing, gears on said counter-shaft adapted to mesh respectively with said gears on said driving shaft and said propeller shaft, a plurality of slidable rods mounted in said casing below said driving shaft, said rods having independent engaging elements and independent forks within said casing for engaging and sliding certain of said gears, and an external manipulating rock shaft extending within said casing above said driving shaft, said rock shaft having a downwardly projecting arm adapted to engage at will any one of the respective engaging elements of said slidable rods.

2. The combination of a casing, a driving shaft extending into said casing, a plurality of gears mounted thereon, a propeller shaft in alinement with said driving shaft, one end of said propeller shaft extending into said casing, a gear and a clutch element mounted on said propeller shaft, one of said gears on said driving shaft carrying a coöperating clutch element, a counter shaft mounted in said casing, gears on said counter-shaft adapted to mesh respectively with said gears on said driving shaft and said propeller shaft, a plurality of slidable rods mounted in said casing below said driving shaft, said rods having independent engaging elements and independent forks within the casing for sliding certain of said gears, and an external manipulating rock shaft extending within said casing above said driving shaft, said manipulating rock shaft having a downwardly projecting arm adapted to engage at will any one of the respective engaging elements of said engaging elements.

3. The combination of a casing, a driving shaft mounted to extend within said casing, a plurality of gears thereon, a propeller shaft in alinement with said driving shaft, one end of said propeller shaft mounted in said casing and extending therein, a spur gear fixed on said propeller shaft, a clutch element in stationary relation to said spur gear, one of said plurality of gears carrying a coöperating clutch element, a housing for said first-named clutch element supported by said casing, a counter shaft mounted in said casing, a spur gear mounted on said counter-shaft and adapted to mesh with said spur gear on said propeller shaft, a spur gear on said counter-shaft, a fixed shaft below said driving shaft, two interconnected gears loosely mounted on said fixed shaft, said inter-connected gears being adapted to be brought respectively into mesh with said second-named spur gear on said counter-shaft and one of said plurality of gears, a plurality of slidable rods mounted in said casing, said rods carrying forks for sliding certain of said slidable gears, and an external manipulating rod extending within said casing for sliding at will any one of said slidable rods.

4. The combination of a casing, a shaft mounted in said casing, slidable gears on said shaft, a plurality of fixed gears mounted in said casing, and means for sliding said slidable gears into mesh with said fixed gears, said means comprising a plurality of slidable rods, means including a removable block for mounting said slidable rods in said casing, and a manipulating rod extending into said casing and having a projecting arm adapted to engage at will any one of said slidable rods.

5. The combination of a casing, a plurality of parallel shafts mounted in said casing, slidable and fixed gears on said shafts, a plurality of slidable rods parallel to said shafts and having individual means for sliding said slidable gear into mesh with certain of said fixed gears, said slidable rods having separate engaging means arranged in a line transverse to the direction of length of said slidable rods, means including a removable block disposed in a lower portion of said casing, for mounting said slidable rods in the said casing, and a manipulating rod extending into said casing above said shafts and above said slidable rods, said manipulating rod having a downwardly projecting arm adapted to engage at will any one of said engaging elements.

In testimony whereof I affix my signature, in presence of two witnesses.

GUIDO FORNACA.

Witnesses:
J. S. JOSEPHS,
LEWIS ALLAN.